Jan. 1, 1963 B. J. GRACE ET AL 3,071,728

PORTABLE AUTO RADIO RECEIVER

Filed Sept. 2, 1958 3 Sheets-Sheet 1

INVENTORS.
Billy Joe Grace,
BY James F. O'Toole,
Mueller & Aichele
Att'ys.

PORTABLE AUTO RADIO RECEIVER

Filed Sept. 2, 1958

3 Sheets-Sheet 2

INVENTORS.
Billy Joe Grace,
James F. O'Toole,
BY Mueller & Aichele
Att'ys

PORTABLE AUTO RADIO RECEIVER

Filed Sept. 2, 1958 3 Sheets-Sheet 3

INVENTORS.
Billy Joe Grace,
BY James F. O'Toole,
Mueller & Aichele
Attys.

United States Patent Office 3,071,728

Patented Jan. 1, 1963

3,071,728
PORTABLE AUTO RADIO RECEIVER

Billy J. Grace, Chicago, and James F. O'Toole, Bellwood, Ill., assignors to Motorola, Inc., Chicago, Ill., a corporation of Illinois Filed Sept. 2, 1958, Ser. No. 758,180
6 Claims. (Cl. 325—312)

This invention relates to portable radio receiver assemblies and more particularly to a portable radio receiver which can be mounted within an automobile as well as to means for removably receiving such a unit.

It would obviously be convenient to provide a single radio receiver operable either as a portable or as an automobile radio. However, most portable radio receivers do not operate effectively within an automobile because they do not have sufficient power output to compete successfully with motor, wind and other noises present within the car and also because a portable aerial does not pick up signals well within an automobile. It has been proposed to provide plug-in radio receivers for automobiles but such receivers require the use of special circuits and require the use of substantially different components and manufacturing techniques than those used to make standard portables. Also, these receivers are not conveniently mounted on a standard automobile dashboard without special and expensive accessory equipment.

It is an object of the present invention, therefore, to provide means for conveniently and easily mounting a portable radio receiver within an automobile for effective operation therein.

It is a further object of the invention to provide a portable radio receiver substantially of standard portable receiver design and operable as a portable radio but adapted for quick and easy connection to an antenna and a separate speaker system installed on a car so that its sensitivity and sound output are commensurate with that of ordinary built-in auto radios.

It is another object of the invention to provide convenient mounting means for a portable radio which can be attached easily to the dashboard of an automobile and which can be easily folded against the dashboard when the portable radio is not in use.

It is still a further object of the invention to provide means for making the self-contained battery of a portable radio receiver controllable by the ignition switch of a car in which the receiver is mounted.

A feature of the invention is the provision of a battery powered radio receiver employing substantially standard portable radio circuits but provided with switch means disconnecting the battery from its ground connection within the receiver when the receiver is positioned in the car and at the same time coupling one side of the battery to a ground connection through a relay controlled by the ignition switch of the car so that positioning of the receiver in the car renders the battery inoperative unless the igniton switch is on.

Another feature of the invention is the provision of means for insulating the chassis of a portable radio receiver (normally operated from a 9 volt negative power supply) from the frame of an automobile within which it is mounted and separately grounding the chassis to means within the receiver so that it can operate from a 12 volt positive battery connection.

A further feature of the invention is the provision of a mounting bracket easily connected to the dashboard of an automobile and having means for automatically coupling a radio receiver to an antenna and a speaker mounted on the car and which further can be easily folded against the dashboard of the car when the radio receiver is not in use.

In accordance with the present invention, a combination portable and auto radio receiver is provided including a portable receiver and an amplifier and speaker unit of the type used for auto radios installed in the car. The amplifier stage is electrically connected to a bracket mounted on the dashboard of the car with the bracket having foldable bottom and side panels adapted to hold the case of the portable radio. The back panel of the bracket is provided with projecting means which mate with corresponding projections in the rear of the receiver so that electrical connection is established between the output of the receiver and the amplifier. In one embodiment of the invention, a switching arrangement is provided so that as the radio is mounted in the bracket, the battery of the receiver is connected in circuit through a relay which is held closed only when the ignition of the car is on and when the car battery is connected to drive the amplifier. In this way, the receiver battery drives the various stages of the radio but the more powerful car battery is used to drive the audio amplifier and thus provide for an output of greater volume than can ordinarily be obtained from a portable receiver. At the same time, an external aerial carried by the car is connected directly to the input stage of the receiver. Another embodiment of the invention provides a similar receiver in which the chassis is insulated from the automobile frame when mounted in the aforesaid bracket so that the automobile battery can be used to drive both the receiver and the separate amplifier stage.

Figures 1, 2, 3, 4:
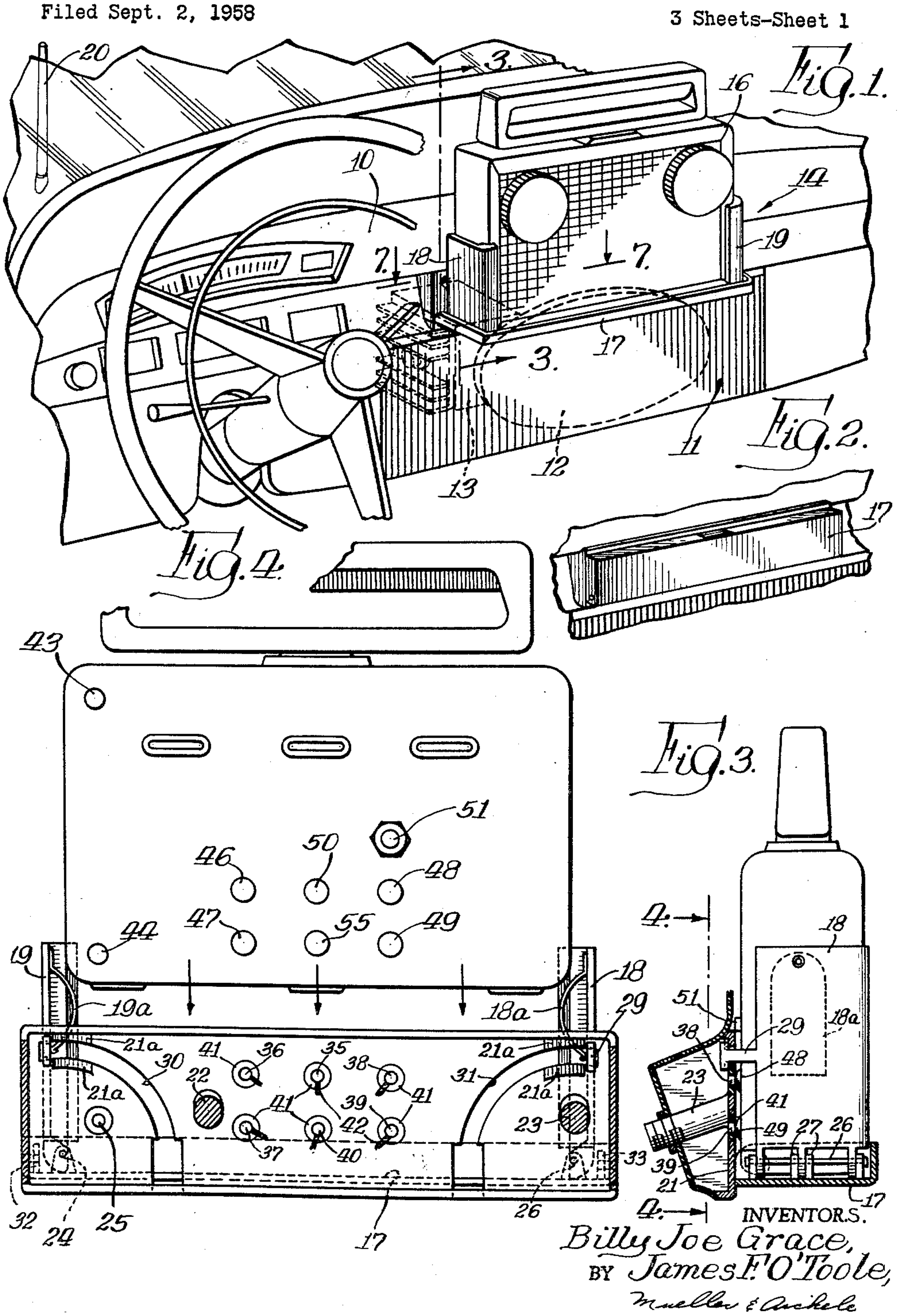
FIG. 1 is a perspective view showing an automobile dashboard with a portable radio receiver held within a mounting bracket and connected to an extended antenna and a separate speaker system.
FIG. 2 is a partial perspective veiw showing the bracket of the present invention in folded position when the radio receiver is not in use.
FIG. 3 is a view taken on the line 3—3 of FIG. 1.
FIG. 4 is a view taken on the line 4—4 of FIG. 3.

FIG. 1 of the accompanying drawings shows an automobile dashboard 10 which includes a standard grill 11 behind which is mounted the speaker 12 and the audio amplifier 13 which will be described in greater detail subsequently. Mounted on the dashboard is a foldable metal bracket 14 in which is positioned a portable radio receiver 16. An external aerial 20, to which the receiver is also connected, is shown as mounted on the automobile body.

As particularly shown in FIGS. 3 and 4, the bracket 14 includes a bottom support plate 17, side arms 18 and 19, and a rear plate 21. The rear plate 21 carries bolts 22 and 23 which fit through holes provided in the dashboard 10 for the control knobs of a standard auto radio receiver. Leaf springs 18*a* and 19*a* are carried on the inner sides of the arms 18 and 19 respectively. The bottom plate 17 carries pins 24 and 26 near its ends with the pins supported by bearing blocks such as 27. Each of the side arms 18 and 19 is provided with suitable lug members such as 28 (see FIG. 7) through which the pin passes so that the side plates are pivotally mounted. Each of the side arms is further provided with a T-shaped extension such as 29 (FIG. 3) which fits into the respective arcuate slots 30 and 31 formed in the rear plate 21.

Figure 7:
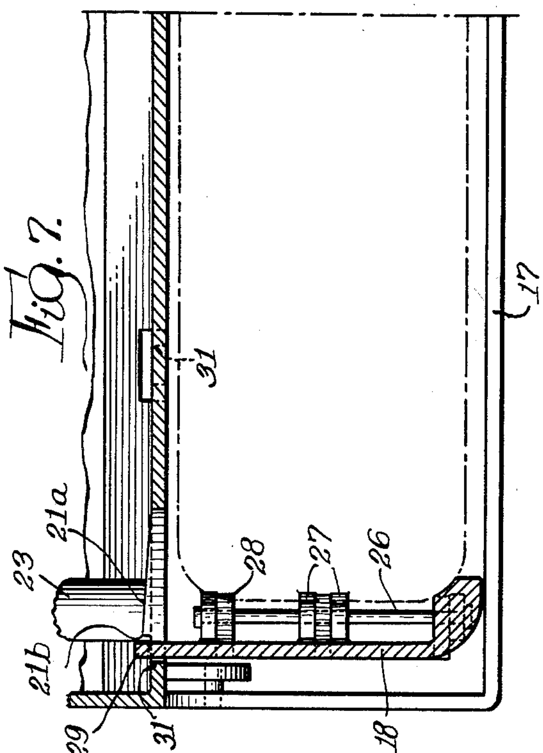
FIG. 7 is a view taken on the line 7—7 of FIG. 1.
Figure 5:
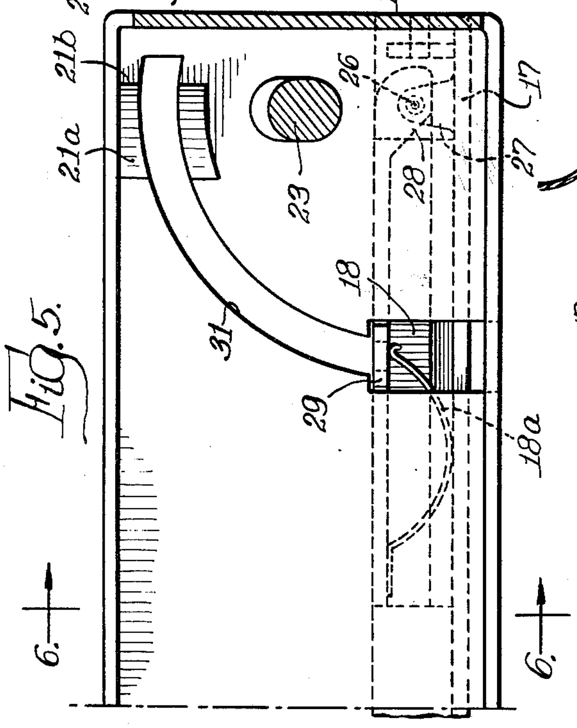
FIG. 5 is a view in front elevation of a portion of the mounting bracket of the invention.

As shown in FIGS. 4 and 5, slots 30 and 31 are widened at their ends adjacent the bottom plate 17 and these widened portions are wider than and accommodate the cross-arms of the T-shaped projections 29. The cross-arms then fit behind the narrow portion of the slots. The back plate 21 has thickened portions 21*a* adjacent the upper ends of each of the slots 30 and 31. As best seen in FIG. 7, each of these portions has a beveled surface and forms a shoulder 21*b* which serves to hold the cross-arm of projection 29 when the side arms 18 and 19 are swung into vertical adjustment to receive the radio case.

Figure 6:
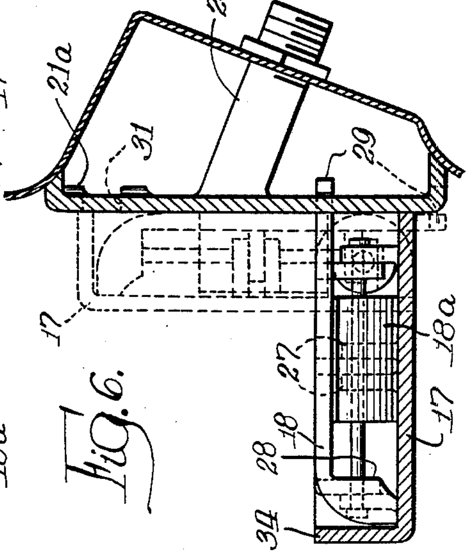
FIG. 6 is a view in section taken on the line 6—6 of FIG. 5 and showing the bottom plate of the bracket in phantom in its folded position.

The rear plate 21 is provided with a pair of lugs 32 and 33 to which the lip portion 34 (FIG. 6) of the bottom plate 17 is hingedly connected. Thus, when the bracket 14 is not used to support a radio receiver, the side arms 18 and 19 are folded inwardly onto the bottom plate 17 and the latter is folded upwardly to the positions shown in phantom in FIG. 6 so that the folded bracket has a neat appearance on the car dashboard 10 as shown in FIG. 2.

Figure 8:
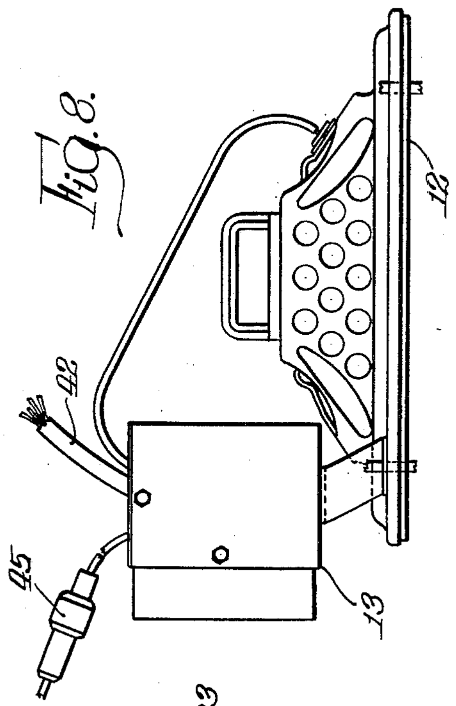
FIG. 8 is a view in side elevation of the speaker and amplifier unit associated therewith which are shown in perspective in FIG. 1.

As indicated in FIG. 4 the rear plate 21 of the bracket is provided with conducting round projections 35, 36, 37, 38, 39 and 40. Each of these projections is insulated from the rest of the plate 21 by an insulating ring indicated at 41. The projections are connected to the audio amplifier 13 through a cable such as 42 shown in FIG. 8. Projection 25 is connected to an external aerial on the automobile.

In mounting the portable radio receiver 16 for use, the bracket 14 is unfolded to the position shown in FIG. 1 and the case 42 of the receiver is slipped between the arms 18 and 19 being held in position by the action of springs 18*a* and 19*a* as its bottom rests on the bottom plate 17. The case of the receiver includes a socket 43 to receive a whip-type aerial when the receiver 16 is used as a portable radio. The rear panel of the receiver case is provided with conductive projections 44, 46, 47, 48, 49, 50 and 55 which are placed so that each of them bears against a correspondingly placed projection from the plate 21 when the receiver is mounted in the bracket. The rear panel of the receiver is also provided with a projecting button 51 which is held in a closed position by the rear plate 21 of the bracket when the receiver is in its mounted position.

When the receiver 16 is mounted in the position shown in FIG. 1, its output is connected through the cable 42 to the audio amplifier 13 and hence to the speaker 12. This connection is made automatically by the bearing of the projections on the bracket against corresponding projections on the panel and by the closing of the button 51 as will be explained in more detail subsequently. All that needs to be done to the portable to adapt for use in the bracket is to remove the whip-type aerial from the socket 43.

Figures 9, 10:
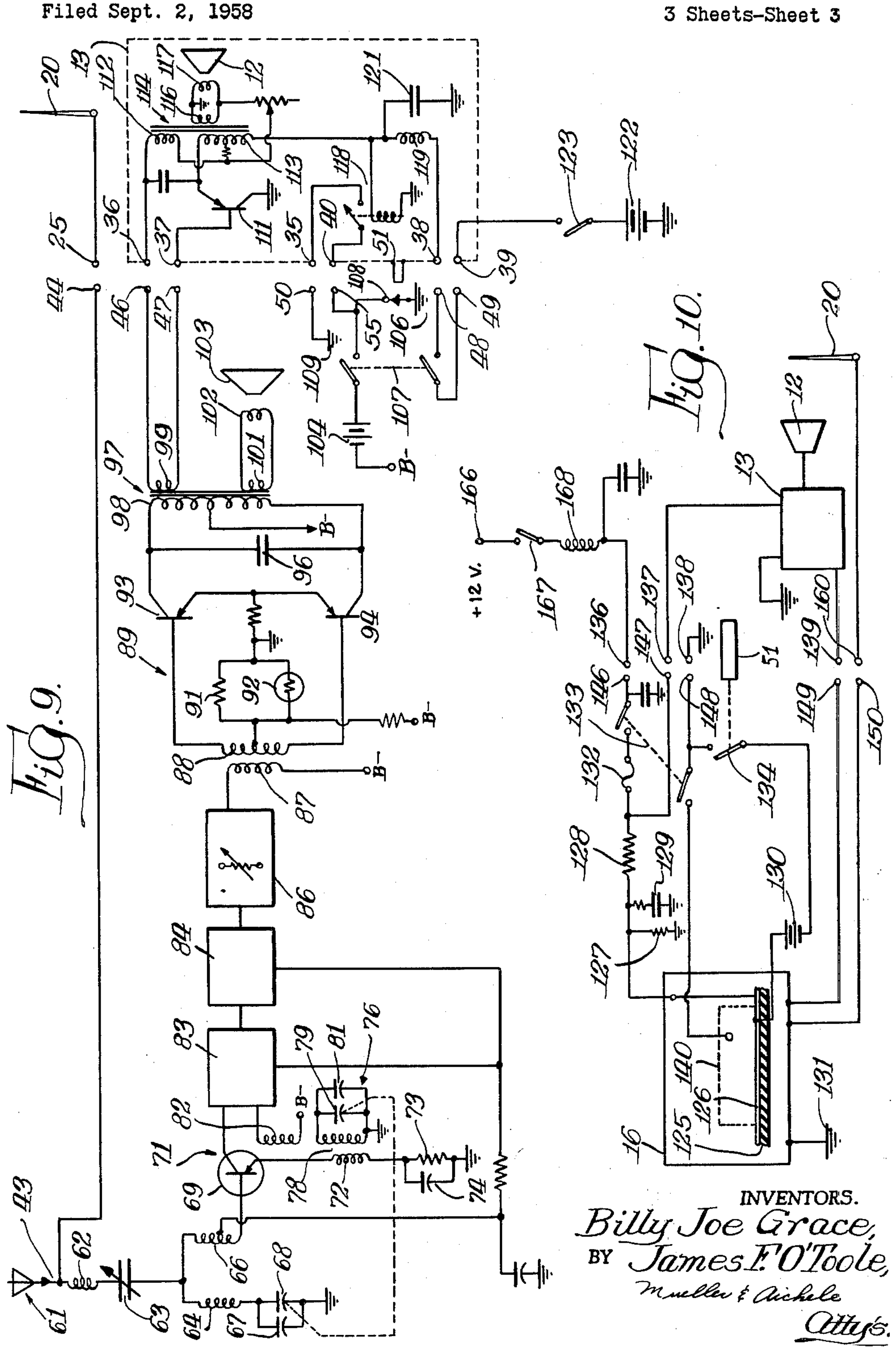
FIG. 9 is a schematic circuit diagram of one embodiment of receiver and speaker in accordance with the present invention.
FIG. 10 is a schematic circuit diagram of the speaker and receiver sections of another embodiment of the invention.

The radio receiver embodying the present invention is essentially a standard portable receiver which has been slightly modified in its circuitry to facilitate connection to an external audio amplifier stage. FIG. 9 is a schematic diagram of the circuit of the receiver in accordance with one embodiment of the invention showing also its mode of connection to the audio amplifier.

The receiver includes a whip-type aerial 61 which is adapted to be detachably mounted in the receiver through the socket 43 shown in FIG. 4. The antenna is coupled to a tuning circuit which includes the coil 62 and the variable capacitor 63 as well as parallel connected coils 64 and 66. Coil 64 is connected to condensers 67 and 68 while coil 66 is coupled to the base of the transistor 69 in a mixer stage generally indicated at 71. The mixer stage also includes the coil 72 and the biasing resistor 73 connected in parallel with capacitor 74. An oscillator generally indicated at 76 includes the coil 78 and the capacitors 79 and 81 with capacitor 79 being ganged to the capacitor 68. The coil 82 is connected to the IF amplifier stage indicated at 83 and a second IF amplifier indicated at 84. These in turn are serially connected to the detector stage 86. The output from the detector stage is connected to the coil 87 inductively coupled to the coil 88 of the first audio amplifier stage indicated generally at 89. This stage also includes the bias stabilizing resistors 91 and 92 and the transistors 93 and 94 connected in push-pull having the distortion filter 96 connected across their respective collectors. The output of this stage passes to the transformer 97 made up of primary winding 98 and the secondary windings 99 and 101. The secondary winding 101 is coupled to the voice coil 102 for the receiver speaker 103.

The receiver is driven by a standard 9 volt dry cell 104 coupled to the ground connection 106 through the on-off switch 107 and the switch 108. The receiver also includes an additional ground connection 109 which is operative when the set is mounted in the car as will be explained subsequently.

The audio amplifier stage indicated generally at 13 includes the power transistor 111 coupled to the primary windings 112 and 113 of a transformer 114 having a secondary winding 116 connected to the voice coil 117 of the speaker 12.

One end of the primary winding 113 is connected to the relay 118 and to the coil 119 and the capacitor 121.

When the radio receiver is mounted in the position shown in FIGS. 1 and 3 of the drawings, electrical connection is made between the receiver and the amplifier by contact 44 engaging contact 25 to establish connection to the external auto antenna 20, the contact indicated at 46 engages the contacts 36, contact 50 engages contact 35, contact 55 engages contact 40, contact 48 engages contact 38, contact 37 engages contacts 47, and contact 49 engages contact 39. This latter contact establishes connection to the 12 volt automobile battery 122.

In establishing this connection, the projection 51 on the receiver engages and opens the switch 108. When the on-off switch 107 of the receiver is closed, the opening of switch 108 disconnects the battery 104 from the ground connection 106. However, connection is now made to the car battery 122 through the contacts 38 and 48 and through contacts 39 and 49 closing the relay 118. This in turn establishes a connection between the battery 104 and ground connection 109 so that the battery is operative to power the radio receiver. Power for the audio amplifier 13, however, is supplied through the car battery 122. Since the ignition switch 123 is interposed between the contact 39 and the battery, the relay 118 will not be closed unless the switch 123 is closed even though the receiver is connected to the amplifier and the on-off switch 107 is turned on. This prevents the receiver from inadvertently being left on and draining the battery when the ignition of the car is off.

FIG. 10 illustrates another embodiment of the invention wherein the battery of the car is used to power both the radio receiver and the audio amplifier. In this embodiment it is necessary to provide means for operating the receiver usually powered by a 9 volt dry cell from the 12 volts of positive potential available from the car battery. The receiver 16 is shown diagrammatically as containing a chassis 126 which is connected to the usual 9 volt dry cell 130 and which is effectively insulated from the frame of the automobile by the spacer indicated at 125. The chassis is also connected through the voltage divider made up of resistors 127 and 128 to the positive 12 volt source at 166. The case of receiver 16 is also grounded at 131. Resistor 128 is connected through the fuse 132 to the on-off switch 133. The receiver also includes a switch 134 which is closed when the receiver is operating as a portable.

In this embodiment, the same type but a different number of contacts on the receiver and bracket are used to establish electrical connections as were illustrated in connection with the description of the other embodiment. When the receiver is mounted operatively within the bracket 14, contact 146 engages contact 136, contact 147 engages contact 137, contact 148 engages contact 138, contact 149 engages contact 139, and contact 150 engages contact 160, the latter set establishing connection to the external aerial of the vehicle. The projection 51 operates to open the switch 134 and thus effectively disconnects the battery 130 and also establishes a ground connection for the components of the receiver indicated diagrammatically at 140.

The receiver is now operatively connected to the amplifier and the receiver is powered from the 12 volt positive source indicated at 166 controlled by the ignition switch 167 and connected to the coil 168. The voltage is dropped through the resistors 128 and 127 so as to operate the receiver and the 12 volt source is connected to the audio amplifier 13 when on-off switch 133 is closed through the connections 136 and 137 and 147. It will be seen that for both modes of connection, the chassis 126 is positive with respect to the components 140 mounted thereon. In this embodiment also the receiver is inoperative unless the ignition switch is closed.

The invention thus provides an assembly for mounting a but slightly modified portable radio into an automobile in such a way that the receiver operates through a separate speaker and is audible under driving conditions. The folding mounting bracket provides for easy and convenient connection of the receiver and can easily be folded away when the receiver is not in use.

We claim:

1. A bracket for mounting a portable radio receiver in a vehicle, said bracket including in combination, a back panel, means for securing said back panel in substantially vertical alignment to the interior of said vehicle, means forming a pair of arcuate slots in said back panel, a bottom panel pivotally connected to said back panel, a pair of side arms pivotally connected at opposite edges of said bottom panel, a projection extending from each of said side arms and adapted to fit into one of the slots and spring means carried on the inner walls of said side arms adapted to bear against the sides of the case of a portable radio receiver.

2. A bracket for mounting a portable radio receiver in a vehicle, said bracket including in combination, a back panel, means for securing said back panel in substantially vertical alignment to the dashboard of said vehicle, means forming a pair of arcuate slots in said back panel with the widths of said slots being greater adjacent one end thereof, a bottom panel pivotally connected to said back panel, a pair of side arms pivotally connected at opposite edges of said bottom panel, a T-shaped projection extending from each of said side arms adapted to fit into one of said slots with the cross arm of said T-shaped projection under the narrow portion of said slot and spring means carried on the inner walls of said side arms adapted to bear against the sides of the case of a portable radio receiver.

3. A bracket according to claim 2 including thickened portions in said back panel adjacent the narrow ends of the slots, said portion forming shoulders for securing said projections for vertical alignment of said side arms.

4. A radio receiver assembly for use in a vehicle which has an outside antenna, a direct current power source, a power amplifier stage connected to said power source and a speaker coupled to said amplifier stage, said assembly including in combination; a portable radio receiver mounted in a case and including an on-off switch, a battery power supply, signal translating means, an output transformer and a speaker coupled thereto and mounted to operate through the front of said case; a foldable mounting bracket adapted to receive and support said case with its front facing the occupants of the vehicle, said bracket including a back panel having a pair of arcuate slots therein, means for securing said back panel to an interior portion of said vehicle in a substantially vertical position, a bottom panel pivotally connected to said back panel, a pair of side arms pivotally connected at opposite edges of said bottom panel and foldable thereagainst so that said bottom panel is foldable against said back panel, with each of said side arms having a projection extending therefrom and adapted to fit into one of said pair of slots for suspending said bottom panel in its unfolded position, spring means carried on the inner walls of said side arms and adapted to bear against the sides of said case when received therebetween; said assembly also including electrical contact means including conducting portions on the back of said case and complementary conducting portions on said back panel shaped both to permit vertical sliding movement of the back of said case against said back panel to provide a readily removable electrical connection therebetween and to allow said bottom panel to be folded against said back panel, said contact means being connected to respective circuit means in said receiver and in the vehicle to intercouple the vehicle antenna to said signal translating means of said receiver, the vehicle power amplifier stage to said output transformer, and the vehicle power supply through said on-off switch to the vehicle power amplifier stage whereby said receiver simultaneously controls and operates both said receiver speaker and the vehicle speaker when mounted in said bracket.

5. A radio receiver assembly for inclusion in a vehicle which has a storage battery associated therewith, said assembly including in combination, a fully transistorized portable radio receiver having a self-contained speaker, an audio output transformer and a battery, a case enclosing said receiver, a mounting frame within the vehicle adapted to receive said case, a separate fully transistorized power amplifier stage including a speaker mounted in the vehicle, first electrical contact means on said mounting frame connected to said power amplifier stage, first cooperating electrical contact means on said receiver adapted to establish electrical connection between said audio output transformer of said receiver and said power amplifier stage incident to the reception of said case by said mounting frame, means for electrically connecting said power amplifier stage to the battery of the vehicle, second electrical contact means on said mounting frame and second cooperating electrical contact means on said case for establishing electrical connection between said receiver and said power amplifier stage, switch means within said receiver for operatively connecting said self-contained battery to said receiver, and means operative through said case to open said switch means and disconnect said self-contained battery from said receiver incident to the reception of said case by said mounting frame.

6. A radio receiver assembly for inclusion in a vehicle which has a storage battery and an ignition switch associated therewith, said assembly including in combination, a fully transistorized portable radio receiver having a self-contained speaker, audio output transformer and battery, a case enclosing said receiver, a mounting bracket within the vehicle adapted to receive said case, a separate fully transistorized power amplifier stage mounted in the vehicle, electrical contact means on said bracket connected to said power amplifier stage, cooperating electrical contact means on said case adapted to establish electrical connection between said audio output transformer of said receiver and said power amplifier stage incident to the reception of said case by said bracket, conductor means for connecting said power amplifier stage through the ignition switch to the storage battery of the vehicle, a first circuit including first switch means connecting said self-contained battery directly to said receiver, a second circuit having second switch means connecting said self-contained battery to said receiver incident to reception of said case of said receiver by said bracket, means operative through said case of said receiver and adapted to open said first switch means to open said first circuit incident to the reception of said case of said receiver by said bracket, and relay means connected to said conductor means in parallel with said power amplifier stage, said relay means being energizable to close said second switch means so that when said receiver is mounted in said bracket and the ignition switch is open, said second switch means will also open to prevent excessive drainage of said self-contained battery when the vehicle is not being operated.

References Cited in the file of this patent

UNITED STATES PATENTS

| | | |
|---|---|---|
| 1,179,445 | Manning | Apr. 18, 1916 |
| 1,854,533 | Wexler | Apr. 19, 1932 |
| 2,280,465 | Barrett et al. | Apr. 21, 1942 |
| 2,584,646 | Wagstaff | Feb. 5, 1952 |
| 2,628,140 | Bunce | Feb. 10, 1953 |
| 2,662,975 | Schwarz | Dec. 15, 1953 |
| 2,797,852 | Michalski | July 2, 1957 |
| 2,853,219 | Schwarz | Sept. 23, 1958 |
| 2,866,891 | Princ | Dec. 30, 1958 |